July 30, 1929.   W. J. WILSON   1,722,727
ARTIFICIAL LIMB
Filed Oct. 26, 1927
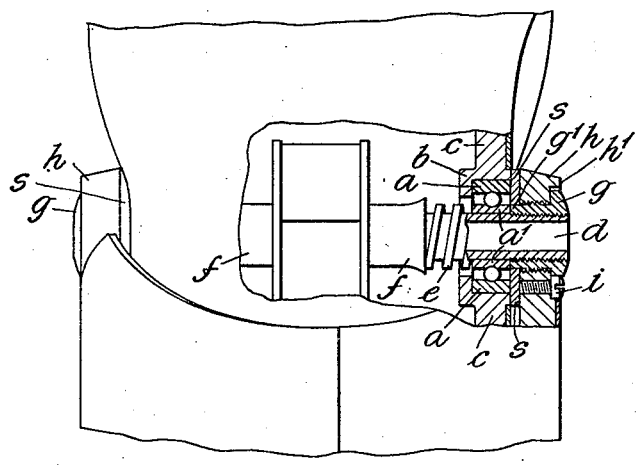
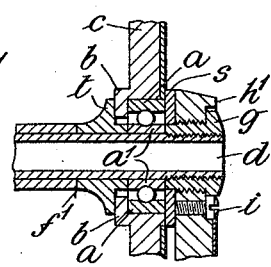
INVENTOR.
W. J. WILSON.
By J. E. M. Fetherstonhaugh
ATTY.

Patented July 30, 1929.

1,722,727

UNITED STATES PATENT OFFICE.

WILLIAM JAMES WILSON, OF LONDON, ENGLAND.

ARTIFICIAL LIMB.

Application filed October 26, 1927. Serial No. 228,732.

This invention relates to artificial limbs, particularly artificial legs provided with ball bearings, and has for its object to provide an improved construction thereof.

The improved construction will be further described with reference to the accompanying drawings from which description and the appended claims the novel features of the invention will be apparent.

Fig. 1 is a part sectional elevation showing a back view of the upper position of an artificial leg embodying the invention.

Fig. 2 is a section through one side of a knee bolt joint showing a modified construction.

In the construction of knee bolt joint shown in Fig. 1, the outer ring $a$ of the ball bearing is mounted in a socket $b$ in a strap or bracket $c$ secured to the upper leg member and the inner ring $a'$ of the said ball bearing is mounted on the knee bolt $d$, being held in place on the inner side of the said knee bolt by a spring $e$ encircling the knee bolt $d$ and bearing at its other end against a central sleeve $f$ also mounted on said knee bolt, the said spring acts to assist in retaining the inner ring $a'$ of the ball bearing in place.

On its outer side the inner ring $a'$ of the ball bearing is held in place by a sleeve-like extension $g'$ of a nut $g$, the said sleeve being threaded internally to screw upon the knee bolt $d$ and threaded externally to engage with the interior of a socket in a strap or bracket $h$ attached to the lower leg member, a locking screw $i$ being provided to prevent the nut moving in relation to the strap or bracket $h$ after the parts have been adjusted.

The bracket $h$ may be provided with outwardly extending rim $h'$ to form a recess for the head of the nut.

It will be seen that the construction described provides an artificial leg in which the ball bearings are fitted in a very simple and convenient manner, and if required washers such as $s$ may be fitted to prevent the access of dust and dirt to the bearings.

Fig. 2 of the drawings is a section of a knee bolt joint showing a modified construction wherein the spring shown in Fig. 1 is omitted, the inner retaining sleeve $f$ being extended right up to the inner ring $a'$ of the ball bearing $a$, while a flange $t$ is provided extending over the face of the socket $b$ on the strap or bracket $c$. The inner retaining sleeve $f$ may be divided as at $f'$ for convenience in assembling the parts.

Otherwise the construction is similar to that of Fig. 1, similar letters of reference being employed for similar parts.

What I claim as my invention and desire to secure by Letters Patent is:—

1. An artificial leg comprising the combination with upper and lower leg members of a knee bolt, a bracket fastened to the upper leg member and formed with a socket, a ball bearing mounted with its outer ring in said socket and its inner ring on said knee bolt, an inner sleeve on said knee bolt, a spring interposed between said inner sleeve and the inner ring of the ball bearing, a bracket attached to the lower leg member and formed with a socket surrounding the knee bolt, a nut formed with an extended sleeve engaging the outer end of the inner ring of the ball bearing, the said sleeve being threaded internally to engage and screw upon said knee bolt and threaded externally to screw into the socket on the bracket attached to the lower leg member and means for locking said nut against movement.

2. An artificial leg comprising the combination with upper and lower leg members, of a knee bolt, a bracket fastened to the upper leg member and formed with a socket, a ball bearing mounted with its outer ring in said socket and its inner ring on said knee bolt, an inner sleeve on said knee bolt, means interposed between said inner sleeve and the inner face of said inner ring, a bracket attached to the lower leg member and formed with a socket surrounding the knee bolt, a nut formed with an extended sleeve engaging the outer face of said inner ring, the said sleeve being threaded internally to engage and screw upon said knee bolt and threaded externally to screw into the socket on the bracket attached to the lower leg member, and means for locking said nut against movement.

WILLIAM JAMES WILSON.